(12) United States Patent
Ma

(10) Patent No.: US 12,428,565 B2
(45) Date of Patent: Sep. 30, 2025

(54) GRAPHENE-MODIFIED SILICON-TITANIUM NANO-POLYMER SLURRY, AND PREPARATION METHOD AND USE THEREOF

(71) Applicant: CHANGSHA TIANYUAN EMPIRE MATERIALS TECHNOLOGY CO., LTD., Hunan (CN)

(72) Inventor: Jinhua Ma, Changsha (CN)

(73) Assignee: CHANGSHA TIANYUAN EMPIRE MATERIALS TECHNOLOGY CO., LTD., Changsha (CN)

( * ) Notice: Subject to any disclaimer, the term of this patent is extended or adjusted under 35 U.S.C. 154(b) by 532 days.

(21) Appl. No.: 17/950,304

(22) Filed: Sep. 22, 2022

(65) Prior Publication Data

US 2023/0039006 A1 Feb. 9, 2023

Related U.S. Application Data

(63) Continuation of application No. PCT/CN2022/092762, filed on May 13, 2022.

(30) Foreign Application Priority Data

Jul. 13, 2021 (CN) .......................... 202110788222.4

(51) Int. Cl.
| | | |
|---|---|---|
| C09D 5/08 | (2006.01) | |
| C09D 1/00 | (2006.01) | |
| C09D 7/62 | (2018.01) | |
| C09D 7/63 | (2018.01) | |
| C09D 7/65 | (2018.01) | |

(52) U.S. Cl.
CPC .............. *C09D 5/084* (2013.01); *C09D 1/00* (2013.01); *C09D 7/62* (2018.01); *C09D 7/63* (2018.01); *C09D 7/65* (2018.01)

(58) Field of Classification Search
None
See application file for complete search history.

(56) References Cited

U.S. PATENT DOCUMENTS

| | | |
|---|---|---|
| 2017/0225233 A1 | 8/2017 | Zhamu et al. |
| 2019/0169443 A1 | 6/2019 | Poteet |

FOREIGN PATENT DOCUMENTS

| CN | 104592864 A | 5/2015 |
|---|---|---|
| CN | 107090205 A | 8/2017 |
| CN | 111662611 A | 9/2020 |
| CN | 112390956 A | 2/2021 |
| CN | 110343443 B | 12/2021 |
| CN | 113416469 B | 3/2022 |

OTHER PUBLICATIONS

Chinese office action issued in Chinese Patent Application 2021 10788222.4, filed on Jul. 13, 2021, issue No. 2021113001566300, mailed on Dec. 3, 2021.
PCT International Search Report of the International Search Authority (CN) issued in PCT/CN2022/092762, filed on May 13, 2022, mailed on Jul. 29, 2022.
PCT Written Opinion of the International Search Authority (CN) issued in PCT/CN2022/092762, filed on May 13, 2022, mailed on Jul. 29, 2022.

*Primary Examiner* — Katarzyna I Kolb
(74) *Attorney, Agent, or Firm* — Basil M. Angelo; ANGELO IP

(57) ABSTRACT

The present disclosure belongs to the technical field of coatings, and in particular relates to a graphene-modified silicon-titanium nano-polymer slurry, and a preparation method and use thereof. When the graphene-modified silicon-titanium nano-polymer slurry provided by the present disclosure is added to a polymer coating, the high resistance of graphene to gas and liquid permeation and the silicon-titanium graphene network structure can significantly increase the resistance of a formed coating layer to medium permeation; due to the corrosion resistance of graphene, titanium, and silicon nanoparticles, a formed coating layer has very high stability, is not easy to react with various media such as an acid, an alkali, and a salt, is not easily consumed to form pores, and is not easy to react with corrosive media to generate soluble salts or cathodic loose and expanded products, which ensures the long-term stability of a composition and a structure of the coating layer.

20 Claims, 12 Drawing Sheets

| Microscope | Accelerating voltage | Magnification | Camera length | Acquisition time | |
|---|---|---|---|---|---|
| JEM-2100F | 200 kV | 30000 x | - | 20/09/07, 09:12 | --------200 nm-------- |

GRAPHENE-MODIFIED SILICON-TITANIUM NANO-POLYMER SLURRY, AND PREPARATION METHOD AND USE THEREOF

CROSS REFERENCE TO RELATED APPLICATION

This application is a continuation of PCT International Application PCT/CN2022/092762, filed May 13, 2022, which claims the benefit of, or priority to, China Patent Application No. 202110788222.4, filed Jul. 13, 2021, both of which are hereby incorporated by reference in their entirety.

TECHNICAL FIELD

The present disclosure belongs to the technical field of coatings, and in particular relates to a graphene-modified silicon-titanium nano-polymer slurry, and a preparation method and use thereof.

BACKGROUND

At present, the application of anti-corrosion coatings is mainly based on the shielding and electrochemical protection mechanisms of the coatings. Coating materials based on a shielding mechanism mainly include micaceous iron oxide (MIO), glass flake, and graphene coatings. Coating materials based on an electrochemical protection mechanism mainly include zinc-rich, aluminum-rich, iron oxide red, chromate, phosphate, and organic corrosion inhibitor coatings. In situations where a coating needs to directly contact a chemically-corrosive medium such as an acidic or alkaline substance, the coating materials based on an electrochemical protection mechanism can hardly be used.

Existing coatings generally have the following disadvantages: A formed coating layer usually has over-sized pores, such as epoxy zinc-rich coatings (epoxy iron oxide red, epoxy zinc phosphate, epoxy glass flake, vinyl glass flake, and the like). An internal main filler is at 200 mesh to 800 mesh and has a fineness of 40 μm or higher after being ground, and thus an internal microscopic gap in a dried coating film is large. In addition, a filler powder needs to be added at a large amount, especially for zinc-rich coatings, and a maximum addition amount can reach 90% or higher, resulting in a low binder content. Due to the physical mixing of materials, a binder and a substrate are covalently adsorbed to each other through hydrogen bonds, resulting in limited adhesion generally of 6 MPa to 10 MPa. Moreover, the resistance to medium permeation is limited. When water vapor molecules penetrate through a coating film and reach an interface of a metal substrate, an adsorption mechanism of a coating layer will be affected or even changed, resulting in adhesion (wet adhesion) very different from the adhesion in a dry state, which makes a bond between the coating layer and the substrate broken and the adhesion lost. When a coating layer loses its wet adhesion, the coating layer will fall off from a metal substrate, which will affect the protective performance of the coating layer.

SUMMARY

In view of this, the present disclosure is intended to provide a graphene-modified silicon-titanium nano-polymer slurry, and a preparation method and use thereof. The graphene-modified silicon-titanium nano-polymer slurry provided by the present disclosure can improve the adhesion performance of a coating, thereby further improving the corrosion resistance.

To achieve the above objective, the present disclosure provides the following technical solutions:

The present disclosure provides a graphene-modified silicon-titanium nano-polymer slurry, prepared from the following raw materials in parts by mass: 40 to 60 parts of titanium hydride, 2 to 5 parts of activated silica, 1 to 2 parts of silane coupling agent (SCA)-modified graphene, 10 to 30 parts of a silicon-modified epoxy resin, 3 to 6 parts of a reactive diluent, 2 to 10 parts of N-methylpyrrolidone (NMP), 1 to 5 parts of a dispersing agent, 1 to 5 parts of a coupling agent, 0.01 to 0.1 part of a catalyst, 0.1 to 0.2 part of a wetting agent, and 0.1 to 0.2 part of a wetting aid.

Preferably, the titanium hydride may have a particle size of greater than or equal to 500 mesh; and the activated silica may have a particle size of 2 nm to 15 nm.

Preferably, an SCA in the SCA-modified graphene may be γ-aminopropyltriethoxysilane.

Preferably, the SCA-modified graphene may have 3 to 7 layers, a thickness of 2 nm to 8 nm, and a sheet diameter of 0.2 μm to 5 μm.

Preferably, a preparation method of the SCA-modified graphene may include the following steps:

mixing graphene, propylene glycol monomethyl ether acetate (PGMEA), the SCA, and water, and subjecting a resulting mixture to ultraviolet (UV) radiation to obtain the SCA-modified graphene.

Preferably, the graphene, the PGMEA, the SCA, and the water may be in a mass ratio of (10-300):(5,000-10,000):(1-20):(1-20).

Preferably, the UV radiation may be conducted at a UV wavelength of 150 nm to 300 nm for 30 min to 90 min.

Preferably, the silicon-modified epoxy resin may be one or more selected from the group consisting of an active solvent-free silicon-modified epoxy resin, an active silicon-modified epoxy phenolic resin, and an active silazane-modified epoxy resin; and a mass content of silicon in the silicon-modified epoxy resin may be higher than 30%.

Preferably, the dispersing agent may be a polymer including an aromatic ring, a polycyclic compound, an amino group, a carboxyl group, or a sulfonyl group.

Preferably, the reactive diluent may be a benzyl glycidyl ether (BGE) reactive diluent or a phenyl glycidyl ether (PGE) reactive diluent.

Preferably, the coupling agent may be an epoxy SCA;
the catalyst may be nano-cerium oxide and/or silicon-modified nanocrystalline γ-alumina;
the wetting agent may be a fluorine-containing acrylate; and the wetting aid may be a fluorine-modified acrylate-based siloxane, an alkyl polyoxyethylene ether phosphate, an alkyl phosphate, or a siloxane phosphate.

The present disclosure provides a preparation method of the graphene-modified silicon-titanium nano-polymer slurry according to the above technical solution, including the following steps:

mixing the titanium hydride, the activated silica, the SCA-modified graphene, the silicon-modified epoxy resin, the reactive diluent, the NMP, the dispersing agent, the coupling agent, the catalyst, the wetting agent, and the wetting aid, and subjecting a resulting mixture to low-temperature nano-scale ball-milling to obtain the graphene-modified silicon-titanium nano-polymer slurry, where the low-temperature nano-scale ball-milling is conducted at 50° C. to 70° C.

Preferably, the mixing may be achieved by stirring at 800 rpm to 1,000 rpm for 5 min to 30 min.

Preferably, the low-temperature nano-scale ball-milling may be conducted at 140 rpm to 160 rpm for 3 h to 10 h.

Preferably, mill balls used for the low-temperature nano-scale ball-milling may be made of stainless steel, bearing steel, zirconia ceramic, or agate; the mill balls may have a diameter of 5 mm to 15 mm; and a gradation of the mill balls may be as follows: 10% of mill balls with a diameter of 5 mm, 20% of mill balls with a diameter of 8 mm, 30% of mill balls with a diameter of 10 mm, 30% of mill balls with a diameter of 12 mm, and 10% of mill balls with a diameter of 15 mm.

The present disclosure provides use of the graphene-modified silicon-titanium nano-polymer slurry according to the above technical solution or a graphene-modified silicon-titanium nano-polymer slurry prepared by the preparation method of the graphene-modified silicon-titanium nano-polymer slurry according to the above technical solution in a heavy-duty anti-corrosion coating.

The present disclosure provides a graphene-modified silicon-titanium nano-polymer slurry, prepared from the following raw materials in parts by mass: 40 to 60 parts of titanium hydride, 2 to 5 parts of activated silica, 1 to 2 parts of SCA-modified graphene, 10 to 30 parts of a silicon-modified epoxy resin, 3 to 6 parts of a reactive diluent, 2 to 10 parts of NMP, 1 to 5 parts of a dispersing agent, 1 to 5 parts of a coupling agent, 0.01 to 0.1 part of a catalyst, 0.1 to 0.2 part of a wetting agent, and 0.1 to 0.2 part of a wetting aid. In the graphene-modified silicon-titanium nano-polymer slurry provided by the present disclosure, a hydroxyl group of the silicon-modified epoxy resin is combined with a titanium atom on a surface of the titanium hydride particle to form a Ti—O—C bond; an epoxy group of the silicon-modified epoxy resin is combined with an amino group on a surface of the SCA-modified graphene to form a C—N bond; a silanol group of the silicon-modified epoxy resin is combined with a silanol group of the activated silica to form a Si—O—Si bond; the silanol compounds (SCA-modified graphene, silicon-modified epoxy resin, activated silica, and coupling agent) form Ti—O—Si bonds with titanium atoms of the titanium hydride particles; the remaining hydroxyl and silanol groups of the silicon-modified epoxy resin react with the surface of the titanium hydride particles for grafting, and the epoxy group at the other terminal of the silicon-modified epoxy resin reacts with the amino group on the surface of the SCA-modified graphene for grafting; and an epoxy group in a molecular branch of the silicon-modified epoxy resin is grafted with the amino group on the surface of the SCA-modified graphene. Through the multiple grafting reactions, a complex polymerized silicon-titanium graphene network structure is formed, and during the grafting processes, a large number of open rings are formed to generate many hydroxyl and silanol groups, which can effectively improve an anchoring and bonding reaction of the coating on a surface of a substrate and improve the adhesion (especially the wet adhesion) of a coating layer, with an adhesion of 25 Mpa or higher on a metal.

In the present disclosure, a formula of the graphene-modified silicon-titanium nano-polymer slurry is optimized, such that the high-temperature grafting is not required and the grafting can be completed in a low-temperature ball-milling process during which a temperature is controlled with cold air to obtain the graphene-modified silicon-titanium nano-polymer slurry, which has the characteristics of safe operation, small odor, short ball-milling time, high milling efficiency, and high grafting degree between nanoparticles and polymer resin materials. The graphene-modified silicon-titanium nano-polymer slurry has characteristics such as long-term storage stability, hydrophilicity, and lipophilicity. When used as an additive for a heavy-duty anti-corrosion coating, the graphene-modified silicon-titanium nano-polymer slurry can greatly improve the compactness and mechanical performance of a coating layer, thereby resisting the permeation and corrosion of various media and improving the comprehensive anti-corrosion properties of the coating layer such as impact resistance, flexibility, and abrasion resistance.

In the graphene-modified silicon-titanium nano-polymer slurry provided by the present disclosure, the SCA-modified graphene and the titanium hydride and activated silica nanoparticles themselves have excellent corrosion resistance, such that a formed coating layer has very high stability, is not easy to react with various media such as an acid, an alkali, and a salt, is not easily consumed to form pores, and is not easy to react with corrosive media to generate soluble salts or cathodic loose and expanded products, which ensures the long-term stability of a composition and a structure of the coating layer; and the silicon-modified epoxy resin polymer and the titanium hydride and activated silica particles form an organic-inorganic hybrid network, which, in combination with a two-dimensional (2D) structure of graphene, enables an internal stress to be dispersed and transmitted and makes a coating layer exhibit have prominent hardness, toughness, abrasion resistance, and cracking resistance. The strong shielding ability of graphene allows a coating layer to show excellent resistance to gas and liquid permeation, and the nano-network structure of silicon-titanium graphene also greatly improves the resistance of the coating layer to medium permeation, thereby improving the corrosion resistance of the coating layer.

DETAILED DESCRIPTION OF THE EMBODIMENTS

Figure 1:
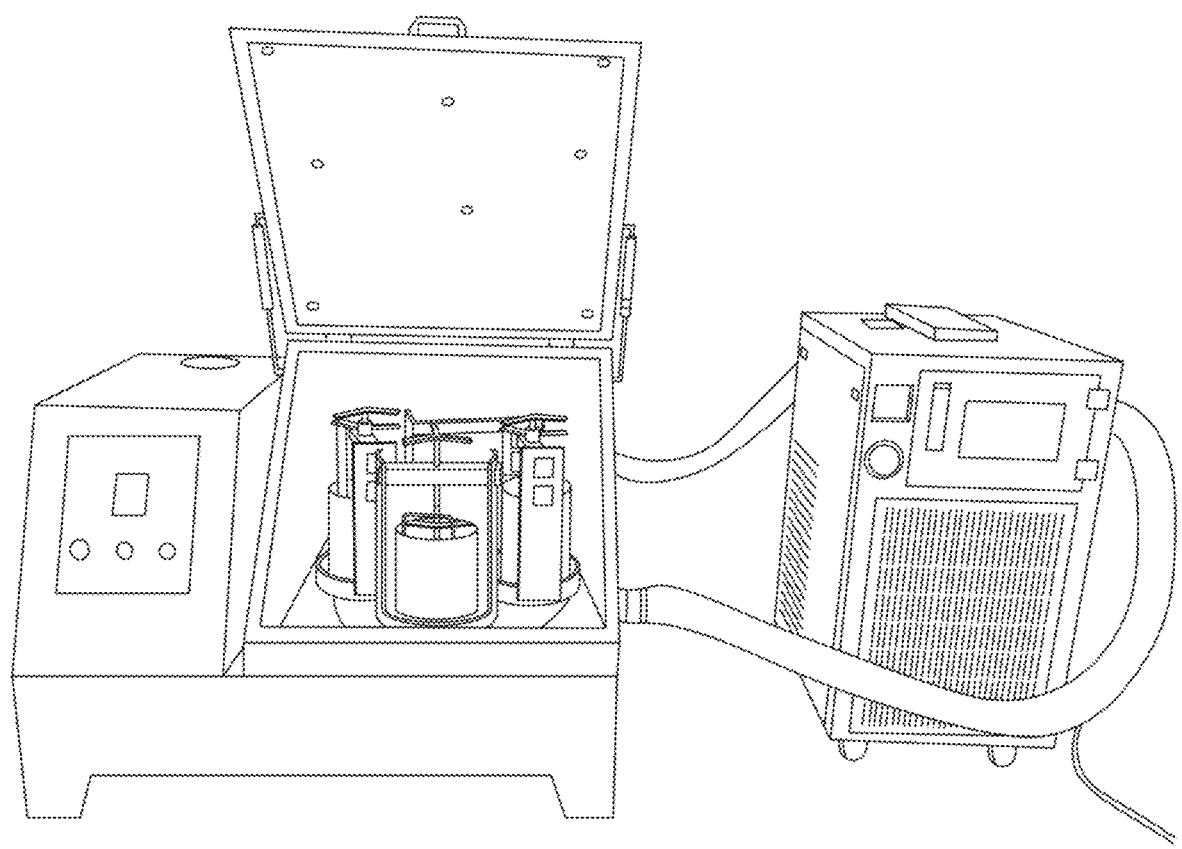
FIG. 1 is a picture of the XQM-20L nano-scale ball mill.

The present disclosure provides a graphene-modified silicon-titanium nano-polymer slurry, prepared from the following raw materials in parts by mass: 40 to 60 parts of titanium hydride, 2 to 5 parts of activated silica, 1 to 2 parts of SCA-modified graphene, 10 to 30 parts of a silicon-modified epoxy resin, 3 to 6 parts of a reactive diluent, 2 to 10 parts of NMP, 1 to 5 parts of a dispersing agent, 1 to 5 parts of a coupling agent, 0.01 to 0.1 part of a catalyst, 0.1 to 0.2 part of a wetting agent, and 0.1 to 0.2 part of a wetting aid.

Unless otherwise specified, the present disclosure has no special limitations on sources of the used raw materials, and commercially-available products well known to those skilled in the art may be adopted.

In parts by mass, the raw materials for preparing the graphene-modified silicon-titanium nano-polymer slurry provided by the present disclosure may include 40 to 60 parts and preferably 45 to 55 parts of titanium hydride.

In the present disclosure, the titanium hydride may have a particle size of preferably larger than or equal to 500 mesh.

The titanium hydride used in the present disclosure is brittler than pure titanium and thus is easily broken. The silanol group on the surface of broken titanium hydride nanoparticles reacts with the epoxy group in the polymer epoxy resin material to produce SI—O-TI, such that the titanium hydride particles and the epoxy resin are grafted to produce an organic-inorganic hybrid polymer in which soft and hard phases are alternately arranged, and the organic-inorganic hybrid polymer has a uniform particle distribution with nano-scale inorganic particles, which can improve the force support and thus improve the abrasion resistance of a coating layer.

Based on the parts by mass of titanium hydride, the raw materials for preparing the graphene-modified silicon-titanium nano-polymer slurry provided by the present disclosure may include 2 to 5 parts and preferably 3 to 4 parts of activated silica.

In the present disclosure, the activated silica may have a particle size of 2 nm to 15 nm.

In the present disclosure, the activated silica serves as a milling agent to assist the milling, and includes large silanol groups, which can be condensed with the silanol groups of the SCA-modified epoxy resin and the coupling agent and reacts with the silanol groups on the surface of the titanium hydride nanoparticles for grafting to obtain a three-dimensional (3D) silicon-titanium nano-polymer network slurry.

Based on the parts by mass of titanium hydride, the raw materials for preparing the graphene-modified silicon-titanium nano-polymer slurry provided by the present disclosure may include 1 to 2 parts and preferably 2 parts of SCA-modified graphene.

In the present disclosure, the SCA-modified graphene may have preferably 3 to 7 layers, a thickness of preferably 2 nm to 8 nm, and a sheet diameter of preferably 0.2 μm to 5 μm.

In the present disclosure, a preparation method of the SCA-modified graphene may preferably include the following steps:

mixing graphene, PGMEA, the SCA, and water, and subjecting a resulting mixture to UV radiation to obtain the SCA-modified graphene.

In the present disclosure, an SCA in the SCA-modified graphene may be preferably γ-aminopropyltriethoxysilane and more preferably KH-550, A-1100, Z-6011, KBE-903, or AMEO.

In the present disclosure, the γ-aminopropyltriethoxysilane may have a structural formula shown as follows:

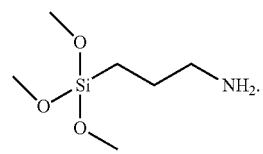

In the present disclosure, the graphene, the PGMEA, the SCA, and the water may be in a mass ratio of preferably (10-300):(5,000-10,000):(1-20):(1-20) and more preferably 100:7900:5:5.

In the present disclosure, the UV radiation may be conducted at a UV wavelength of preferably 150 nm to 300 nm and more preferably 150 nm to 280 nm; and the UV radiation may be conducted for preferably 30 min to 90 min and more preferably 40 min to 80 min.

In the process of graphene modification, ozone generated from UV radiation of oxygen oxidizes the surface of graphene, and in the environment of water molecules, the surface of graphene is oxidized to generate carbonyl, hydroxyl, and carboxyl groups; and the carbonyl, hydroxyl, and carboxyl groups generated on the surface of graphene undergo a grafting reaction with the silanol group generated from the hydrolysis of the SCA under high-energy radiation to obtain the SCA-modified graphene.

In the present disclosure, a polar group produced by the modified graphene may be shown in the following formula (1):

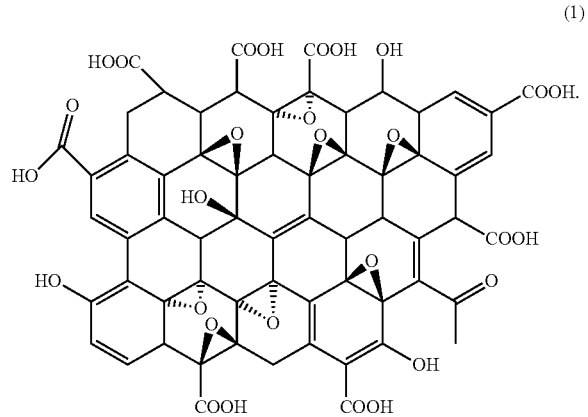

The grafting modification of the polar group produced by the KH-550-modified graphene with the silanol group may be shown in the following formula (2):

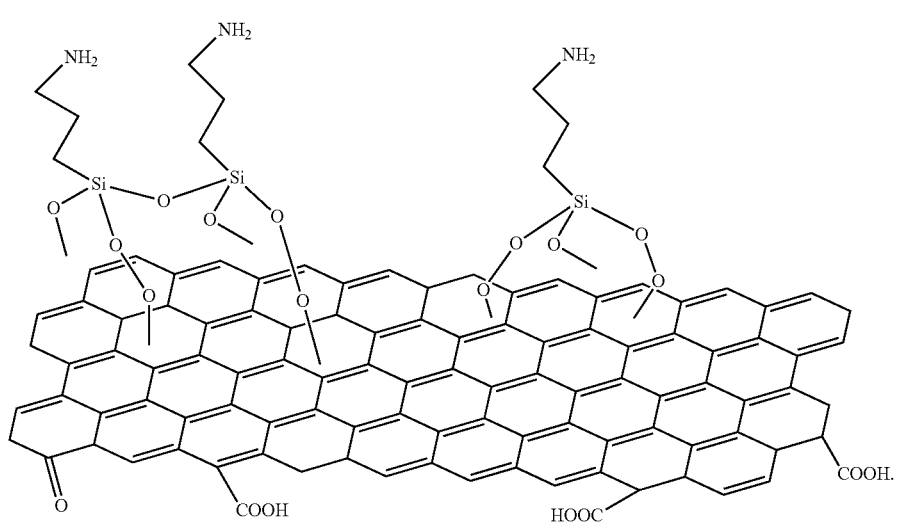

In the present disclosure, the graphene has a 2D flaky structure with prominent shielding performance, and when tiled in the silicon-titanium graphene network structure, the structure can make a coating layer dense and improve the corrosion resistance of the coating layer.

Based on the parts by mass of titanium hydride, the raw materials for preparing the graphene-modified silicon-titanium nano-polymer slurry provided by the present disclosure may include 10 to 30 parts and preferably 15 to 25 parts of silicon-modified epoxy resin.

In the present disclosure, the silicon-modified epoxy resin may be preferably one or more selected from the group consisting of an active solvent-free silicon-modified epoxy resin, an active silicon-modified epoxy phenolic resin, and an active silazane-modified epoxy resin, and more preferably a mixture of the active solvent-free silicon-modified epoxy resin, the active silicon-modified epoxy phenolic resin, and the active silazane-modified epoxy resin; and when the silicon-modified epoxy resin is two or more selected from the above, the present disclosure has no special limitations on a ratio of the two or more, and any ratio may be adopted. When the silicon-modified epoxy resin is a mixture of the active solvent-free silicon-modified epoxy resin, the active silicon-modified epoxy phenolic resin, and the active silazane-modified epoxy resin, the active solvent-free silicon-modified epoxy resin, the active silicon-modified epoxy phenolic resin, and the active silazane-modified epoxy resin may be in a mass ratio of preferably 6:3:1.

In the present disclosure, a mass content of silicon in the silicon-modified epoxy resin may be greater than 30%.

In the present disclosure, the active silazane-modified epoxy resin may have a structural formula shown in the following formula (3):

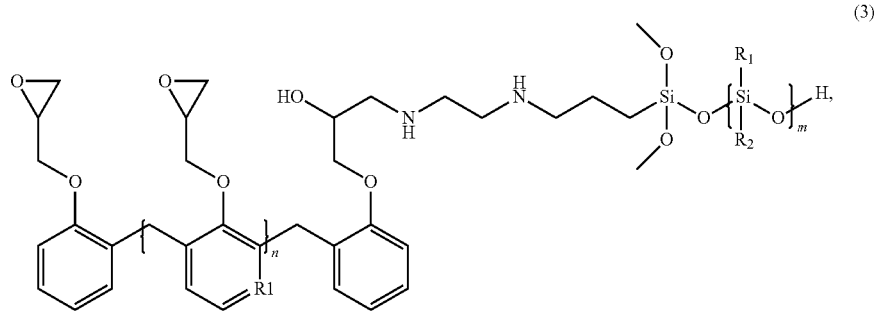

where $R_1$ is a methyl group and $R_2$ is a phenyl group, or $R_1$ is a phenyl group and $R_2$ is a methyl group; and m and n are each a natural number.

In the present disclosure, the active silicon-modified epoxy phenolic resin may have a structural formula shown in the following formula (4):

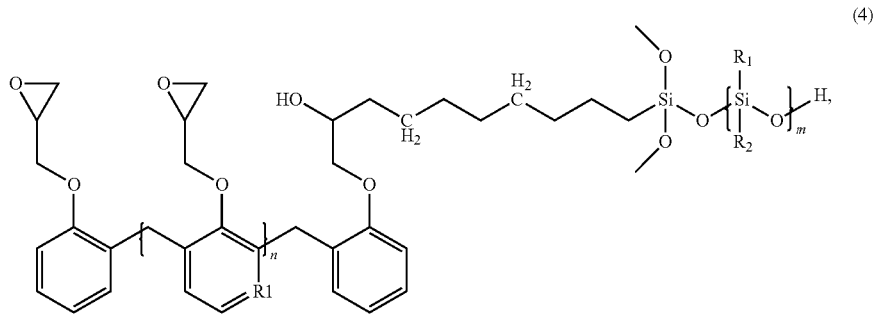

(4)

where $R_1$ is a methyl group and $R_2$ is a phenyl group, or $R_1$ is a phenyl group and $R_2$ is a methyl group; and m and n are each a natural number.

In the present disclosure, the active solvent-free silicon-modified epoxy resin may have a structural formula shown in the following formula (5):

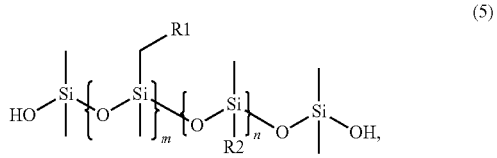

(5)

where

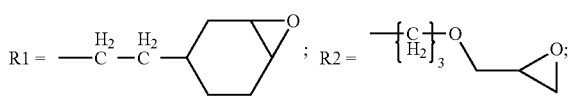

and m and n are each a natural number.

In the present disclosure, a reaction formula of a grafting reaction between the silicon-modified epoxy phenolic resin and the titanium hydride particles may be as follows:

The silanol and hydroxyl groups of the silicon-modified epoxy resin are grafted with the surface of the nano-sized titanium hydride; due to the surface effect and small volume effect, the nano-sized titanium hydride has very high surface atom activity, and under the action of the catalyst, dangling bonds generated on the surface of Ti atoms are bonded and grafted to form Ti—O—C and Ti—O—Si bonds; and the epoxy functional group of the silicon-modified epoxy resin in the above formula can also be grafted with the amino group in the coupling agent on the surface of the SCA-modified graphene to link the titanium hydride and graphene to form a complex network polymer.

Based on the parts by mass of titanium hydride, the raw materials for preparing the graphene-modified silicon-titanium nano-polymer slurry provided by the present disclosure may include 3 to 6 parts and preferably 4 to 5 parts of a reactive diluent.

In the present disclosure, the reactive diluent may be preferably a BGE reactive diluent or a PGE reactive diluent, and more preferably a 692 reactive diluent (BGE reactive diluent) from Anhui Xinyuan Technology Co., Ltd. or a 690 reactive diluent (PGE reactive diluent) from Anhui Xinyuan Technology Co., Ltd.

The reactive diluent used in the present disclosure can reduce the viscosity of the slurry system, and has a boiling point of 200° C. or higher, which is safe and environmentally friendly.

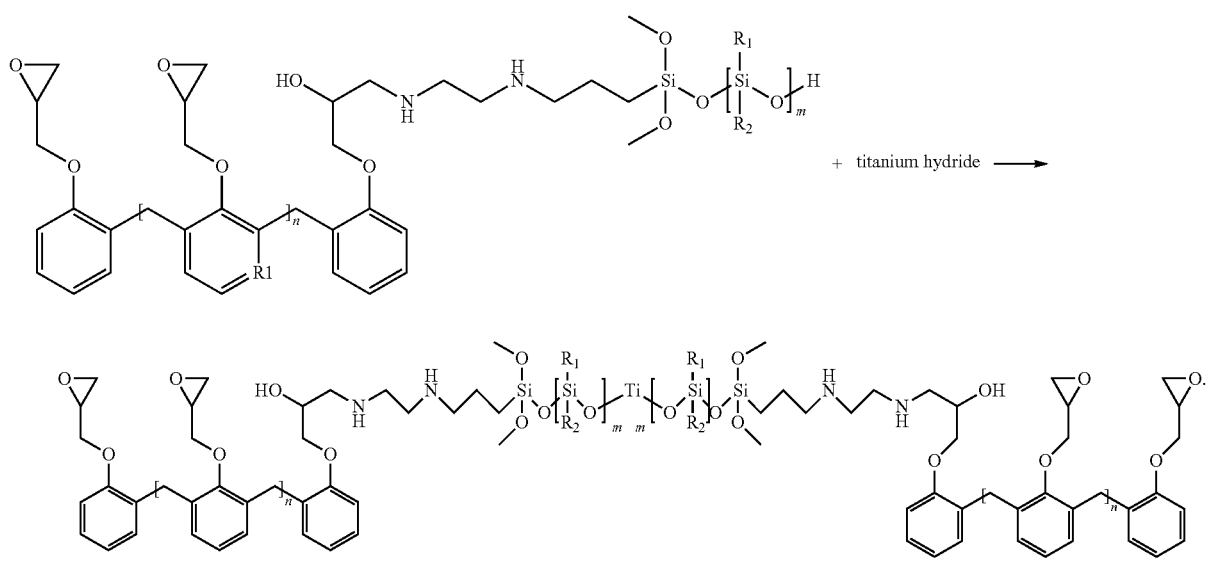

Based on the parts by mass of titanium hydride, the raw materials for preparing the graphene-modified silicon-titanium nano-polymer slurry provided by the present disclosure may include 2 to 10 parts and preferably 3 to 9 parts of NMP.

In the present disclosure, NMP is used to reduce the viscosity of the slurry system, and has a boiling point of 200° C. or higher, which is safe and environmentally friendly. In addition, NMP is miscible with water, which is conducive to general coatings that can be dispersed in both water and oil at a later stage and will not cause the incompatibility problem.

Based on the parts by mass of titanium hydride, the raw materials for preparing the graphene-modified silicon-titanium nano-polymer slurry provided by the present disclosure may include 1 to 5 parts and preferably 2 to 4 parts of a dispersing agent.

In the present disclosure, the dispersing agent may preferably be a polymer including an aromatic ring, a polycyclic compound, an amino group, a carboxyl group, or a sulfonyl group, and more preferably Changsha Peite VK-DP345 (a polymer including an aromatic ring, a polycyclic compound, and a carboxyl group), Shanghai Tiger Polymer TECH5010 (an amino-containing polycyclic compound polymer), or BYK-Chemie BYKI10 (a polymer including carboxyl and sulfonyl groups).

In the present disclosure, before being refined and grafted with the silicon-modified epoxy resin, coupling agent, and activated silica, the titanium hydride particles are relatively large and are easy to settle. The added dispersing agent can anchor and disperse the titanium hydride and activated silica before the titanium hydride particles are refined and grafted to prevent their agglomeration and settlement. The dispersing agent can also anchor and disperse the titanium hydride and activated silica that are not fully covered and grafted in the later stage to prevent their agglomeration and settlement, thereby ensuring the long-term dispersibility and storage stability of the final graphene-modified silicon-titanium nano-polymer slurry. The graphene-modified silicon-titanium nano-polymer slurry will not settle after being stored for one year and is easily self-dispersed in various solvents.

Based on the parts by mass of titanium hydride, the raw materials for preparing the graphene-modified silicon-titanium nano-polymer slurry provided by the present disclosure may include 1 to 5 parts and preferably 2 to 4 parts of a coupling agent.

In the present disclosure, the coupling agent may be preferably an epoxy SCA, and more preferably Changsha Peite VK SL113 or Shanghai Tiger Polymer TECH7150.

In the present disclosure, the epoxy SCA includes a silanol group at one terminal and an epoxy group at the other terminal, and a curing agent in a coating is an amine curing agent, such that the epoxy group of the epoxy SCA can react with an amino group in the epoxy coating and finally the two are cured together to form a solid network structure.

Based on the parts by mass of titanium hydride, the raw materials for preparing the graphene-modified silicon-titanium nano-polymer slurry provided by the present disclosure may include 0.01 to 0.1 part and preferably 0.02 to 0.08 part of a catalyst.

In the present disclosure, the catalyst may be preferably nano-cerium oxide and/or silicon-modified nanocrystalline γ-alumina, and more preferably a mixture of nano-cerium oxide and silicon-modified nanocrystalline γ-alumina. When the catalyst is a mixture of nano-cerium oxide and silicon-modified nanocrystalline γ-alumina, the nano-cerium oxide and the silicon-modified nanocrystalline γ-alumina may be in a mass ratio of 2:1. In the present disclosure, the nano-cerium oxide may have a particle size of preferably 1 nm to 10 nm.

In the present disclosure, the catalyst can improve the activity of silanol groups in the silicon-modified epoxy resin, the coupling agent, and the activated silica, and catalyze the cleavage of some epoxy groups in the silicon-modified epoxy resin to generate more hydroxyl groups for grafting with the surface of titanium hydride particles and with the hydroxyl group of activated silica.

Based on the parts by mass of titanium hydride, the raw materials for preparing the graphene-modified silicon-titanium nano-polymer slurry provided by the present disclosure may include 0.1 to 0.2 part and preferably 0.11 to 0.19 part of a wetting agent.

In the present disclosure, the wetting agent may be preferably a fluorine-containing acrylate and more preferably Dego 450.

In the present disclosure, the wetting agent can improve the surface wetting and wrapping speed of the silicon-modified epoxy resin, the coupling agent, the titanium hydride, and the activated silica, such as to prepare for the subsequent grafting reaction.

Based on the parts by mass of titanium hydride, the raw materials for preparing the graphene-modified silicon-titanium nano-polymer slurry provided by the present disclosure may include 0.1 to 0.2 part and preferably 0.11 to 0.19 part of a wetting aid.

In the present disclosure, the wetting aid may be preferably a fluorine-modified acrylate-based siloxane, an alkyl polyoxyethylene ether phosphate, an alkyl phosphate, or a siloxane phosphate, and more preferably T-7588 of Guangzhou Hengyu Trading Co., Ltd. or ADDITOL XL180 of Allnex.

In the present disclosure, the wetting aid can change the surface energy of the surface of the titanium hydride and activated silica, and can quickly wet the surface of the titanium hydride and activated silica, which is convenient for the spreading and reaction of organic polymers and modifiers on the surface and ultimately affects the surface energy of a coating layer.

The present disclosure also provides a preparation method of the graphene-modified silicon-titanium nano-polymer slurry according to the above technical solution, including the following steps:

mixing the titanium hydride, the activated silica, the SCA-modified graphene, the active solvent-free silicon-modified epoxy resin, the reactive diluent, the NMP, the dispersing agent, the coupling agent, the catalyst, the wetting agent, and the wetting aid, and subjecting a resulting mixture to low-temperature nano-scale ball-milling to obtain the graphene-modified silicon-titanium nano-polymer slurry, where the low-temperature nano-scale ball-milling is conducted at 50° C. to 70° C.

In the present disclosure, the titanium hydride, the activated silica, the SCA-modified graphene, the silicon-modified epoxy resin, the reactive diluent, the NMP, the dispersing agent, the coupling agent, the catalyst, the wetting agent, and the wetting aid are mixed.

In the present disclosure, a device used for the mixing may be preferably a high-speed stirring device and more preferably a BGD741 high-speed dispersion device.

In the present disclosure, the titanium hydride, the activated silica, the SCA-modified graphene, the silicon-modified epoxy resin, the reactive diluent, the NMP, the dispersing agent, the coupling agent, the catalyst, the wetting agent, and the wetting aid may preferably be added to the high-speed stirring device in the order of liquid first and then solid for mixing.

In the present disclosure, the mixing may be achieved preferably by stirring; and the stirring may be conducted at a rate of preferably 800 rpm to 1,000 rpm and more preferably 850 rpm to 950 rpm, and the stirring may be conducted for preferably 5 min to 30 min and more preferably 10 min to 20 min.

In the present disclosure, a mixture obtained after the mixing may be subjected to low-temperature nano-scale ball-milling.

In the present disclosure, the low-temperature nano-scale ball-milling may be conducted at a temperature of preferably 50° C. to 70° C. and more preferably 60° C. to 70° C.; the low-temperature nano-scale ball-milling may be conducted at a rate of preferably 140 rpm to 160 rpm and more preferably 145 rpm to 155 rpm; the low-temperature nano-scale ball-milling may be conducted for preferably 3 h to 10 h and more preferably 5 h to 9 h; mill balls used for the low-temperature nano-scale ball-milling may preferably be made of stainless steel, bearing steel, zirconia ceramic, or agate; the mill balls may have a diameter of preferably 5 mm to 15 mm and more preferably 5 mm, 8 mm, 10 mm, 12 mm, and 15 mm; and a gradation of the mill balls may be preferably as follows: 10% of 5 mm mill balls, 20% of 8 mm mill balls, 30% of 10 mm mill balls, 30% of 12 mm mill balls, and 10% of 15 mm mill balls.

In the present disclosure, a device used for the low-temperature nano-scale ball-milling may be preferably a nano-scale ball mill and more preferably an XQM-20L nano-scale ball mill. In the present disclosure, a structure of the XQM-20L nano-scale ball mill is shown in FIG. 1, where a frequency conversion refrigerator is arranged at a right side of the XQM-20L nano-scale ball mill, which is connected to a ball-milling chamber of the ball mill for temperature control and has a refrigeration capacity of 7,000 W to 10,000 W, an air volume of 2,000 L/min to 5,000 L/min, and a minimum temperature of −10° C. The ball mill includes four 5 L stainless steel ball-milling tanks with an autorotation speed of 0 rpm to 640 rpm and a revolution speed of 0 rpm to 320 rpm, and each ball-milling tank is filled with 5 kg to 10 kg of mill balls and 3 kg to 3.5 kg of materials.

In the present disclosure, the compounding of the active solvent-free silicon-modified epoxy resin, reactive diluent, and NMP is adopted to reduce the viscosity of the system to an optimal viscosity for ball-milling, thereby ensuring the ball-milling efficiency; and the reactive diluent and NMP each have a boiling point of 200° C. or higher, which can fully guarantee the safety of ball-milling and the controllability of volatile organic compound (VOC) volatilization.

Beyond the raw material ratio range of the present disclosure, the mill balls in the ball-milling tank cannot fully move due to a too-high viscosity of the materials, resulting in low impact milling energy; or the materials will quickly slip away from a gap during the collision of mill balls due to a too-low viscosity, which is not conducive to the ball-milling. Within the mill ball gradation and material-ball ratio (a ratio of the materials to the mill balls) ranges in the present disclosure, the viscosity of the mixed material can effectively improve the collision probability and mechano-chemical energy and helps to shorten the ball-milling time, such that, under the action of the catalyst, the preparation of the slurry can be completed quickly at a low temperature.

In the present disclosure, after the ball-milling is completed, a vibrating sieve may preferably be used to separate a resulting material from the mill balls to obtain the slurry.

In the present disclosure, after the slurry is obtained, the slurry may preferably be stored in a sealed coating iron drum. In the present disclosure, a specification of the coating iron drum may be preferably 36 kg/drum.

In the present disclosure, through the combination of the catalyst and the wetting agent, the titanium hydride particles are refined during the ball-milling process. Due to the surface effect and small volume effect of the nano-sized titanium hydride particles, the titanium atoms on the surface produce dangling bonds and Fermi level discontinuity, and thus are easy to react with reactive groups for grafting; and the silicon-modified epoxy resin undergoes a grafting reaction with the titanium atoms generated from the titanium particles during the ball-milling process, the reactive groups such as silanol and hydroxyl groups in the epoxy resin undergo a bonding reaction with the titanium atoms on the surface of newborn titanium particles, and the silanol group of the activated nano-silica and the active group of the SCA are anchored to and grafted with the silicon-modified epoxy resin and the titanium atoms of the titanium particles, which stabilizes the titanium metal particles. In the process of continuous ball-milling and crushing, the modification and grafting are continuously conducted to finally make the titanium metal reach a target nano-scale fineness, and then the titanium metal particles fully grafted with the epoxy resin polymer material are compounded with the SCA-modified graphene through the SCA, such that the silicon-titanium nanoparticles are fixed on the surface of graphene.

In the present disclosure, a formula of the graphene-modified silicon-titanium nano-polymer slurry is optimized, such that the high-temperature grafting is not required and the grafting can be completed in a low-temperature ball-milling process during which a temperature is controlled with cold air to obtain the graphene-modified silicon-titanium nano-polymer slurry, which has the characteristics of safe operation, small odor, short ball-milling time, high milling efficiency, and high grafting degree between nanoparticles and polymer resin materials. The graphene-modified silicon-titanium nano-polymer slurry has characteristics such as long-term storage stability, hydrophilicity, and lipophilicity. When used as an additive for a heavy-duty anti-corrosion coating material, the graphene-modified silicon-titanium nano-polymer slurry can greatly improve the compactness and mechanical performance of a coating layer, thereby resisting the permeation and corrosion of various media and improving the comprehensive anti-corrosion properties of the coating layer such as impact resistance, flexibility, and abrasion resistance.

In the present disclosure, preparation operations are simple, and no thickening agent needs to be additionally added, which is conducive to the collision ball-milling of the slurry; the ball-milling efficiency is high, and only 4 h to 6 h is required to meet the requirements; no precipitate is produced after the slurry is stored for one year; almost no VOC is emitted during the whole preparation process; the unique formula, the mill balls of preferred gradation, and the frozen ball-milling are conducive to the temperature control and the shutting down and timely opening of a tank for unloading, which greatly improves the efficiency; and a large number of silanol groups are grafted on the surface of graphene and titanium particles and NMP is adopted as a secondary dispersion medium, such that the slurry can be easily added to various oil-based resins and water-based emulsions, which expands the application scope.

The present disclosure also provides use of the graphene-modified silicon-titanium nano-polymer slurry according to the above technical solution or a graphene-modified silicon-titanium nano-polymer slurry prepared by the preparation method of the graphene-modified silicon-titanium nano-polymer slurry according to the above technical solution in a heavy-duty anti-corrosion coating. The present disclosure has no special limitations on use method of the graphene-modified silicon-titanium nano-polymer slurry in the heavy-duty anti-corrosion coating, and use method well known in the art may be adopted.

The technical solutions of the present disclosure will be clearly and completely described below with reference to the examples of the present disclosure.

Example 1

100 g of graphene and 7,900 g of PGMEA were mixed and thoroughly stirred, then 5 g of KH-550 and 5 g of deionized water were added dropwise, and a resulting mixture was thoroughly stirred, placed on a 500×300 mm stainless steel tray, and subjected to high-energy UV radiation for 60 min in a 254 nm UV cleaning machine to obtain KH-550-modified graphene.

50 parts of titanium hydride (>500 mesh), 3 parts of activated silica (2 nm to 15 nm), 4 parts of KH-550-modified diluent (692 reactive diluent (BGE reactive diluent) of Anhui Xinyuan Technology Co., Ltd.), 5 parts of NMP, 3 parts of a dispersing agent (Changsha Peite VK-DP345), 3 parts of a coupling agent (Changsha Peite VK SL113), 0.05 part of a catalyst (a mixture of nano-cerium oxide and silicon-modified nanocrystalline γ-alumina in a mass ratio of 2:1), 0.15 part of a wetting agent (Dego 450), and 0.15 part of a wetting aid (ADDITOL XL180 of Allnex) were added to a BGD741 high-speed dispersion device in the order of liquid first and then solid, and a resulting mixed material was thoroughly stirred at 900 rpm for 10 min, then transferred into ball-milling tanks of a XQM-20L nano-scale ball mill, and subjected to ball-milling for 6 h (during which the ball mill was in operation for 5 min and not in operation for 1 min) at 150 rpm and 70° C., where each ball-milling tank was filled with 8 kg of stainless steel mill balls including 10% of 5 mm mill balls, 20% of 8 mm mill balls, 30% of 10 mm mill balls, 30% of 12 mm mill balls, and 10% of 15 mm mill balls and 3.2 kg of the above mixed material; and then a resulting material was separated from the mill balls by a vibrating sieve to obtain a graphene-modified silicon-titanium nano-polymer slurry, and the graphene-modified silicon-titanium nano-polymer slurry was finally stored in a sealed coating iron drum at 36 kg/barrel.

Example 2

This example was different from Example 1 only in that, the preparation raw materials were 45 parts of titanium hydride (>500 mesh), 3 parts of activated silica (2 nm to 15 nm), 2 parts of KH-550-modified graphene, 25 parts of a silicon-modified epoxy resin (active silicon-modified epoxy phenolic resin), 4 parts of a reactive diluent (692 reactive diluent (BGE reactive diluent) of Anhui Xinyuan Technology Co., Ltd.), 5 parts of NMP, 3 parts of a dispersing agent (Changsha Peite VK-DP345), 3 parts of a coupling agent (Changsha Peite VK SL113), 0.05 part of a catalyst (a mixture of nano-cerium oxide and silicon-modified nanocrystalline γ-alumina in a mass ratio of 2:1), 0.15 part of a wetting agent (Dego 450), and 0.15 part of a wetting aid (ADDITOL XL180 of Allnex).

Example 3

This example was different from Example 1 only in that, the preparation raw materials were 55 parts of titanium hydride (>500 mesh), 3 parts of activated silica (2 nm to 15 nm), 2 parts of KH-550-modified graphene, 15 parts of a silicon-modified epoxy resin (active silicon-modified epoxy phenolic resin), 4 parts of a reactive diluent (692 reactive diluent (BGE reactive diluent) of Anhui Xinyuan Technology Co., Ltd.), 5 parts of NMP, 3 parts of a dispersing agent (Changsha Peite VK-DP345), 3 parts of a coupling agent (Changsha Peite VK SL113), 0.05 part of a catalyst (a mixture of nano-cerium oxide and silicon-modified nanocrystalline γ-alumina in a mass ratio of 2:1), 0.15 part of a wetting agent (Dego 450), and 0.15 part of a wetting aid (ADDITOL XL180 of Allnex).

Characterization and testing:
1) The graphene-modified silicon-titanium nano-polymer slurry of Example 1 was subjected to color comparison, dispersibility, and settlement tests.

Figure 2:
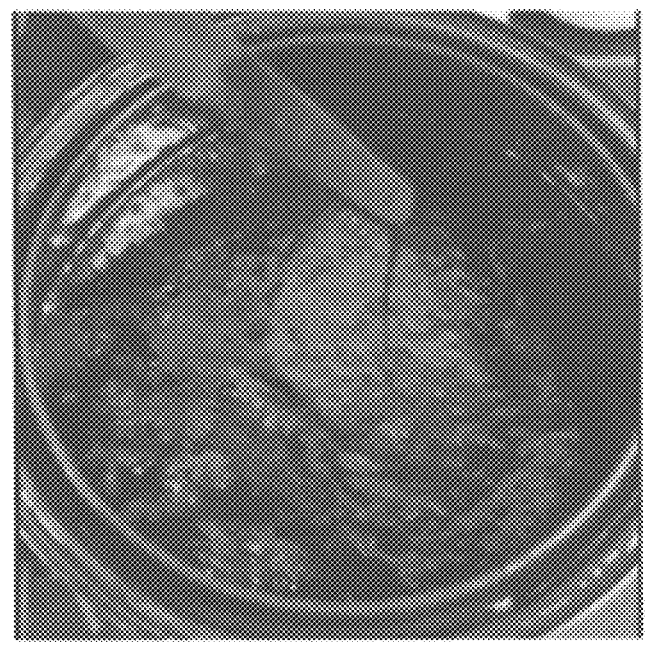
FIG. 2 is a picture of the graphene-modified silicon-titanium nano-polymer slurry of Example 1.
Figure 3:
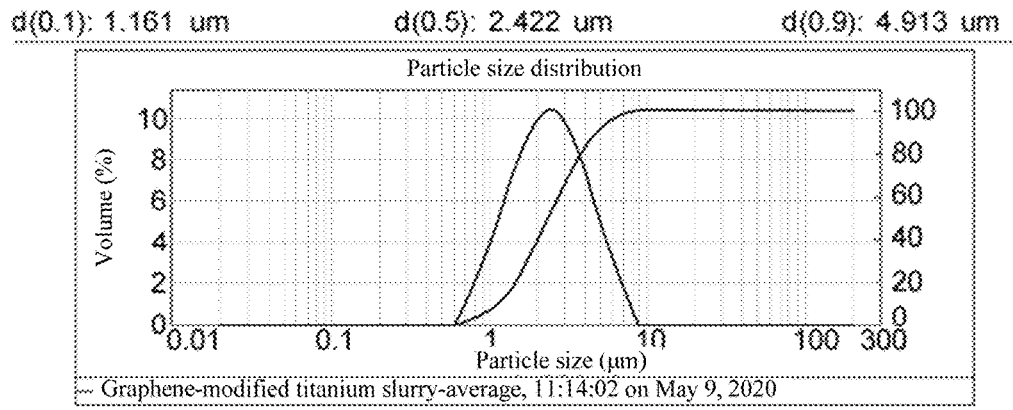
FIG. 3 shows the particle size distribution of the graphene-modified silicon-titanium nano-polymer slurry of Example 1.

It can be seen from FIG. 2 that the graphene-modified silicon-titanium nano-polymer slurry of Example 1 is black. Three drops of the graphene-modified silicon-titanium nano-polymer slurry were added to a disposable cup, and then 20 g of a DBE solvent was added. It was observed that the graphene-modified silicon-titanium nano-polymer slurry was self-dispersed without stirring, and there were no settlement or layering phenomena within 48 h.

2) The particle size and composition of the graphene-modified silicon-titanium nano-polymer slurry of Example 1 were tested (outsourced), and test results were shown in FIG. 3 to FIG. 14.

It can be seen from FIG. 3 to FIG. 14 that the graphene in the graphene-modified silicon-titanium nano-polymer slurry of Example 1 has a particle size of less than 10 μm, and the titanium nanoparticles in the graphene-modified silicon-titanium nano-polymer slurry of Example 1 have an average particle size of less than 50 nm; and a content of the graphene is higher than 1.5%, and a content of the titanium nanoparticles is higher than 60%.

3) SEM

Sample treatment: The graphene-modified silicon-titanium nano-polymer slurry of Example 1 was diluted 104 times with ethanol, and then subjected to an ultrasonic treatment at a frequency of 40 KHz for 30 min to obtain a sample dispersion. The dispersion was allowed to stand for 6 h, 10 μL of an upper dispersion was taken and added dropwise to a microgrid for high-resolution transmission electron microscopy (HRTEM), then the microgrid was dried at room temperature for 12 h during which the microgrid was covered properly to prevent dust pollution, and the sample was loaded for observation. Observation results were shown in FIG. 3 to FIG. 14.

Figure 4:
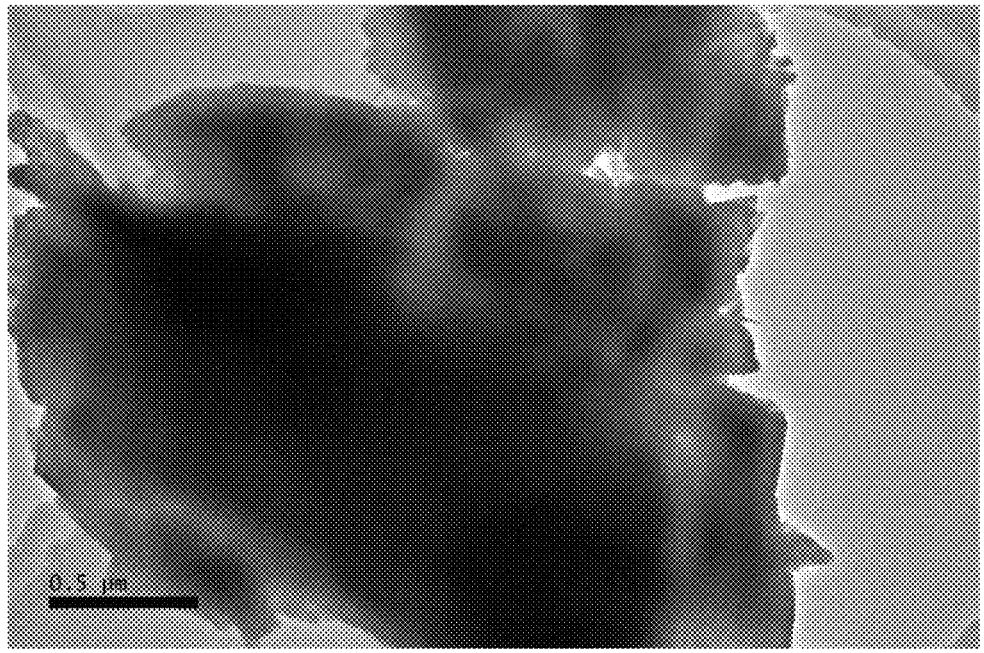
FIG. 4 is a scanning electron microscopy (SEM) image of the graphene-modified silicon-titanium nano-polymer slurry of Example 1 at a scale of 0.5 μm.
Figure 5:
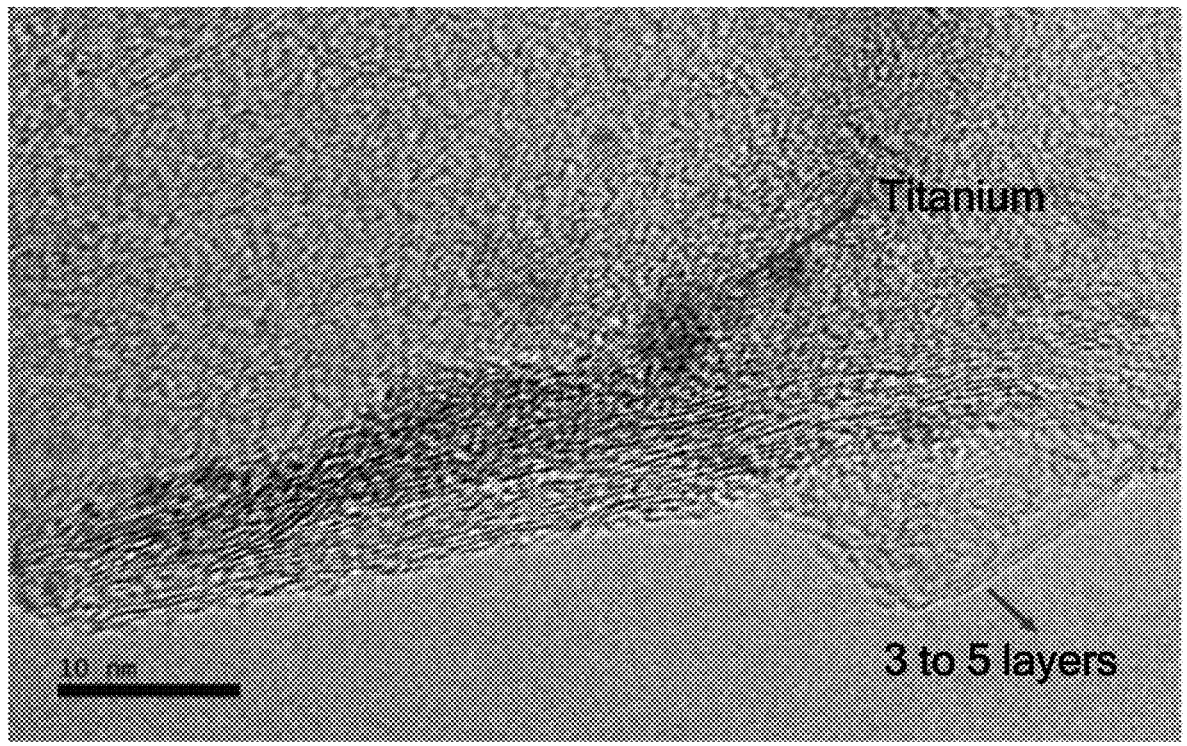
FIG. 5 is an SEM image of the graphene-modified silicon-titanium nano-polymer slurry of Example 1 at a scale of 10 nm.
Figure 6:
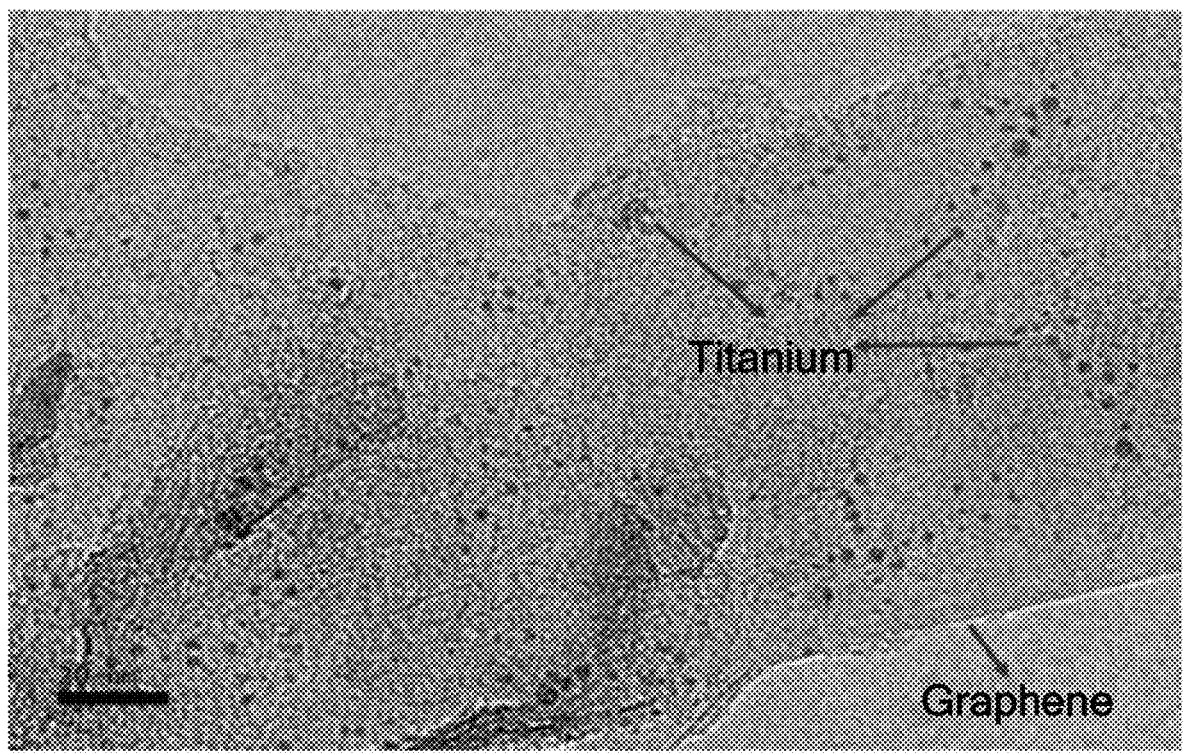
FIG. 6 is an SEM image of the graphene-modified silicon-titanium nano-polymer slurry of Example 1 at a scale of 20 nm.
Figure 7:
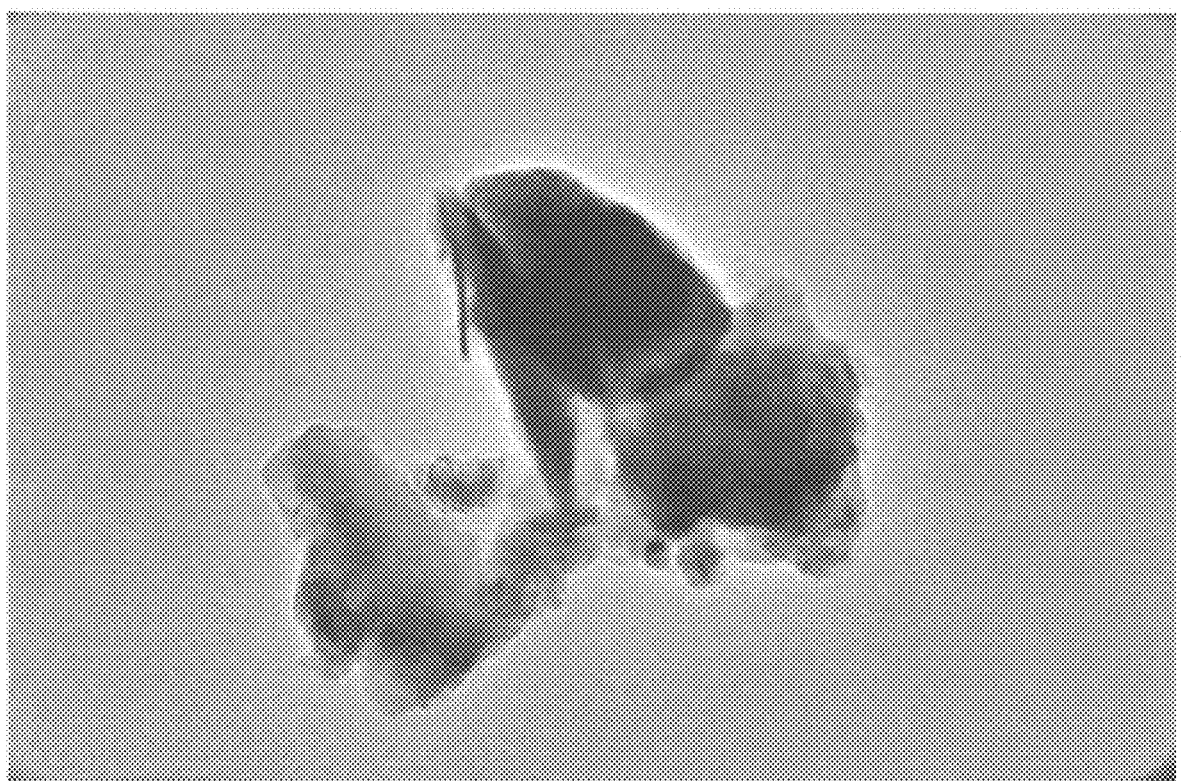
FIG. 7 is an SEM image of the graphene-modified silicon-titanium nano-polymer slurry of Example 1 at a scale of 1 μm.
Figure 8:
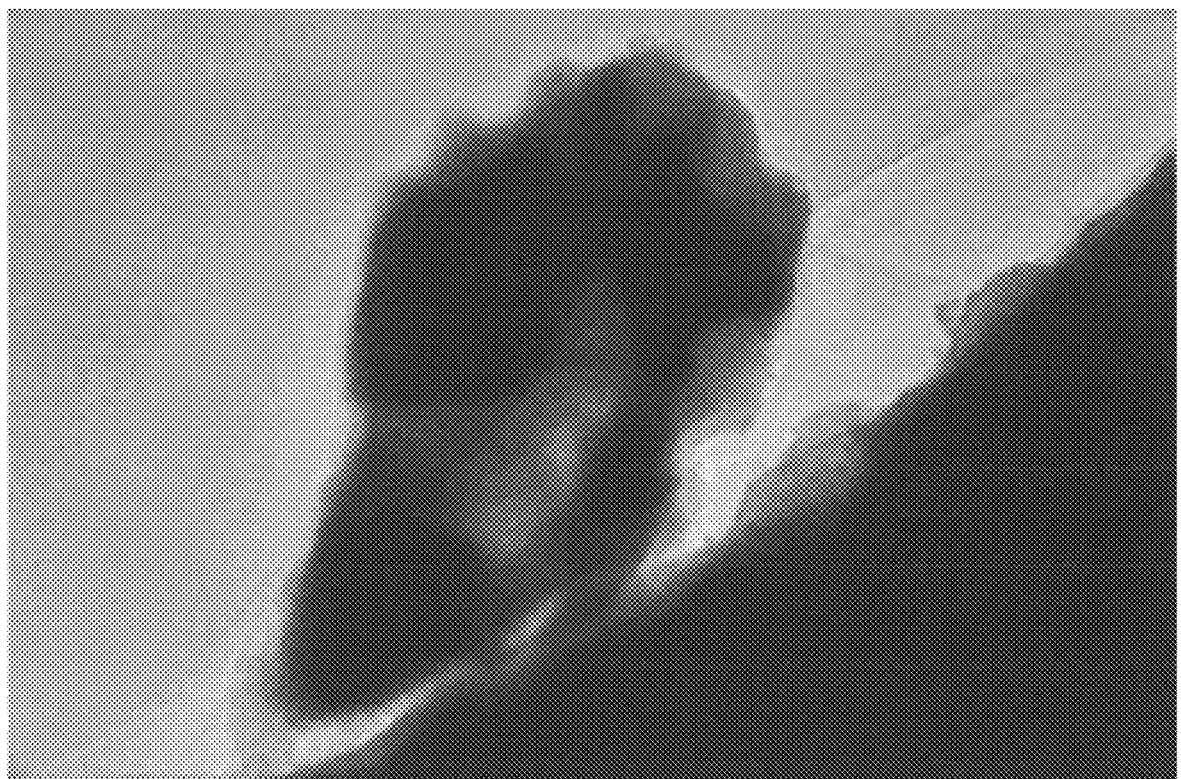
FIG. 8 is an SEM image of the graphene-modified silicon-titanium nano-polymer slurry of Example 1 at a scale of 200 nm.
Figure 9:
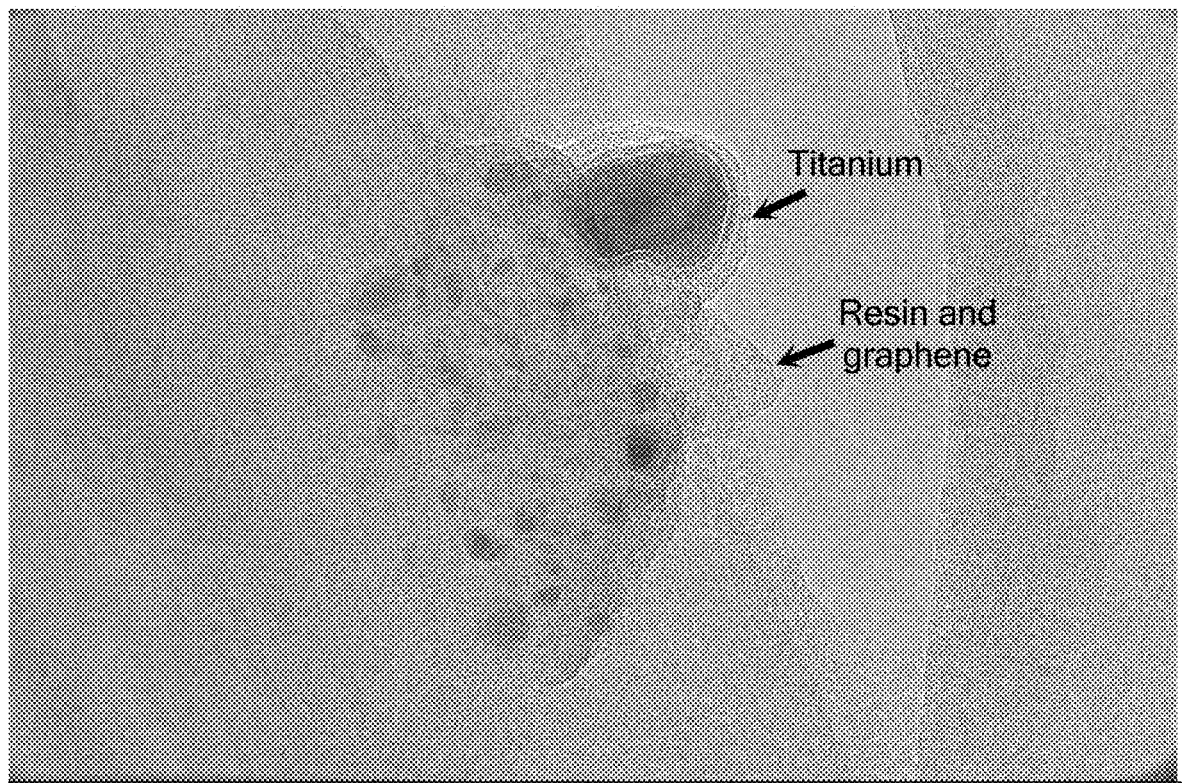
FIG. 9 is an SEM image of the graphene-modified silicon-titanium nano-polymer slurry of Example 1 at a scale of 50 nm.
Figure 10:
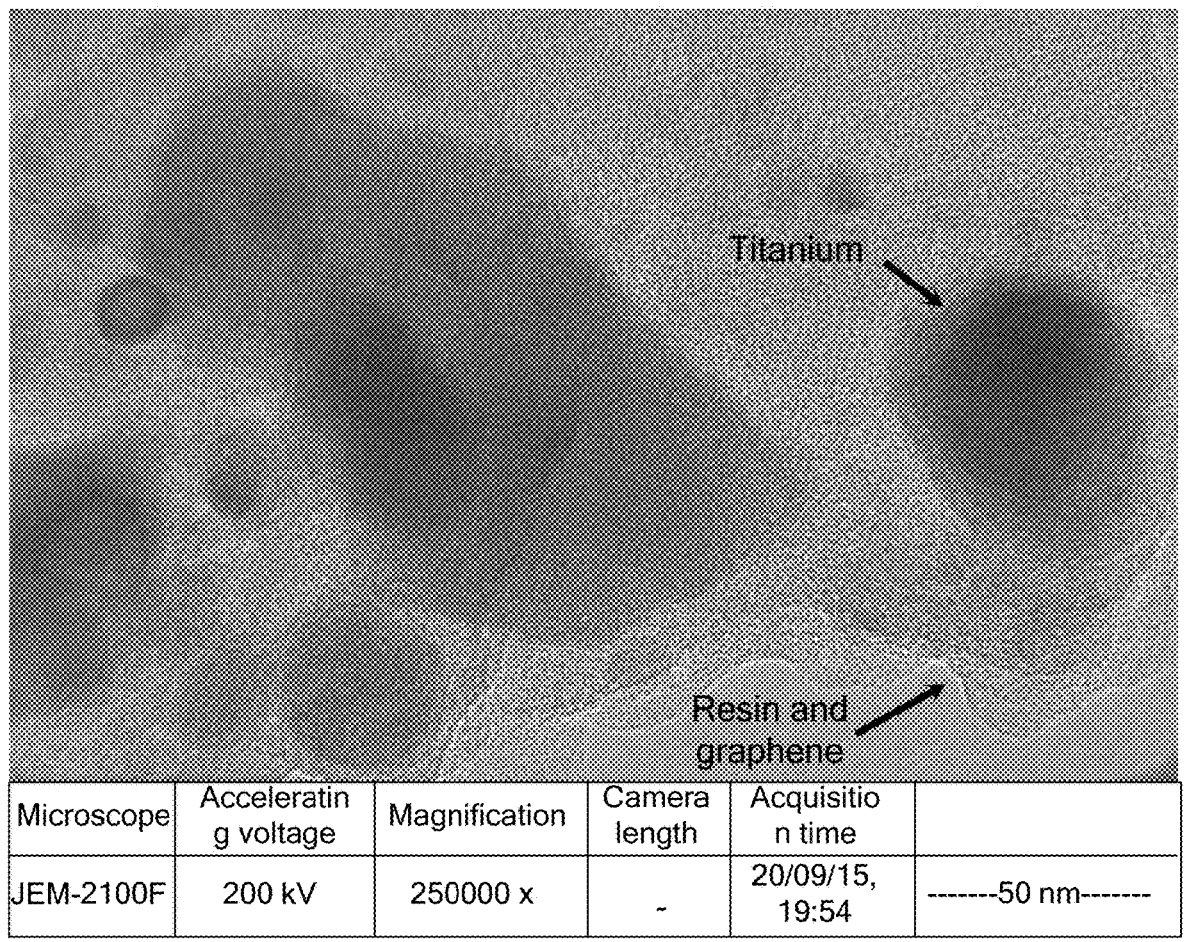
FIG. 10 is an SEM image of the graphene-modified silicon-titanium nano-polymer slurry of Example 1 at a scale of 50 nm.
Figure 11:
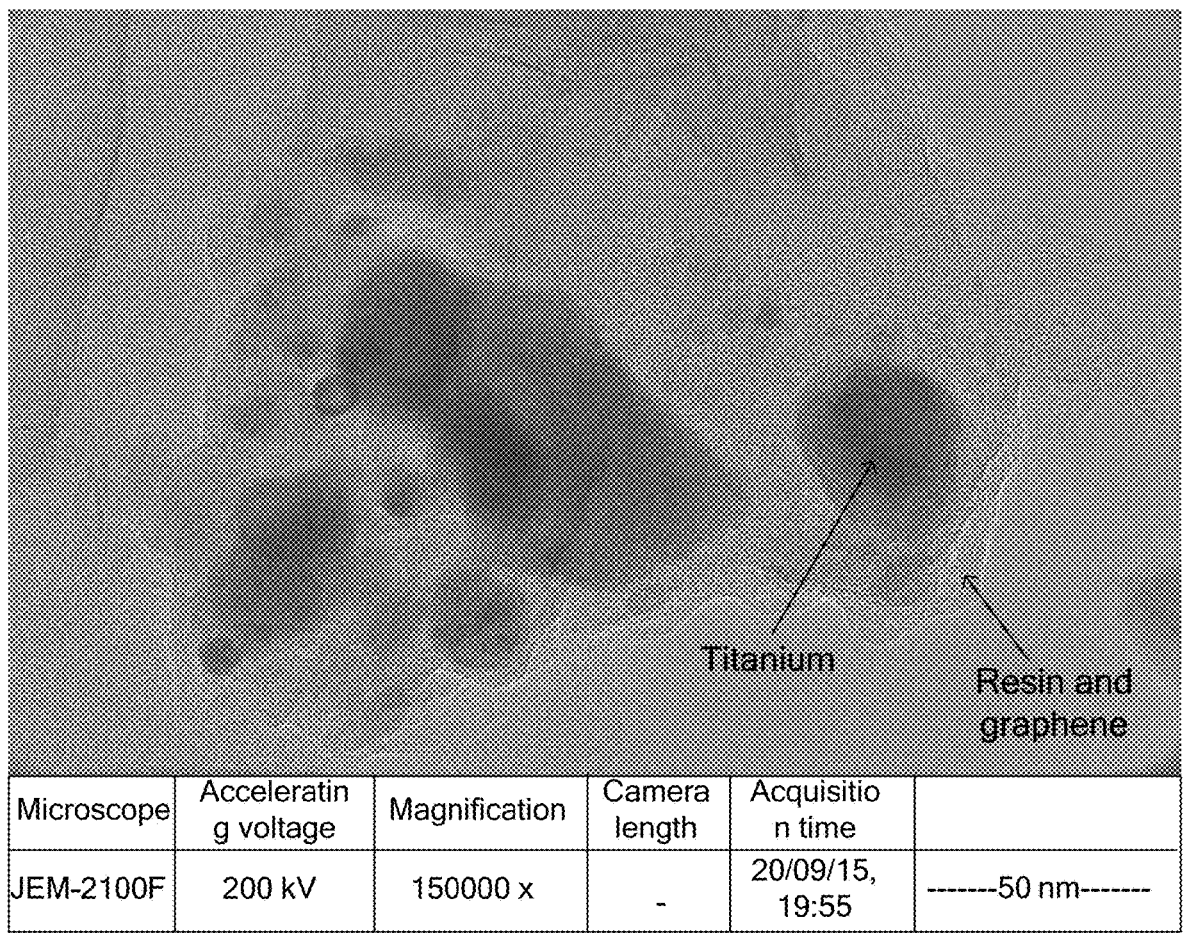
FIG. 11 is an SEM image of the graphene-modified silicon-titanium nano-polymer slurry of Example 1 at a scale of 50 nm.
Figure 12:
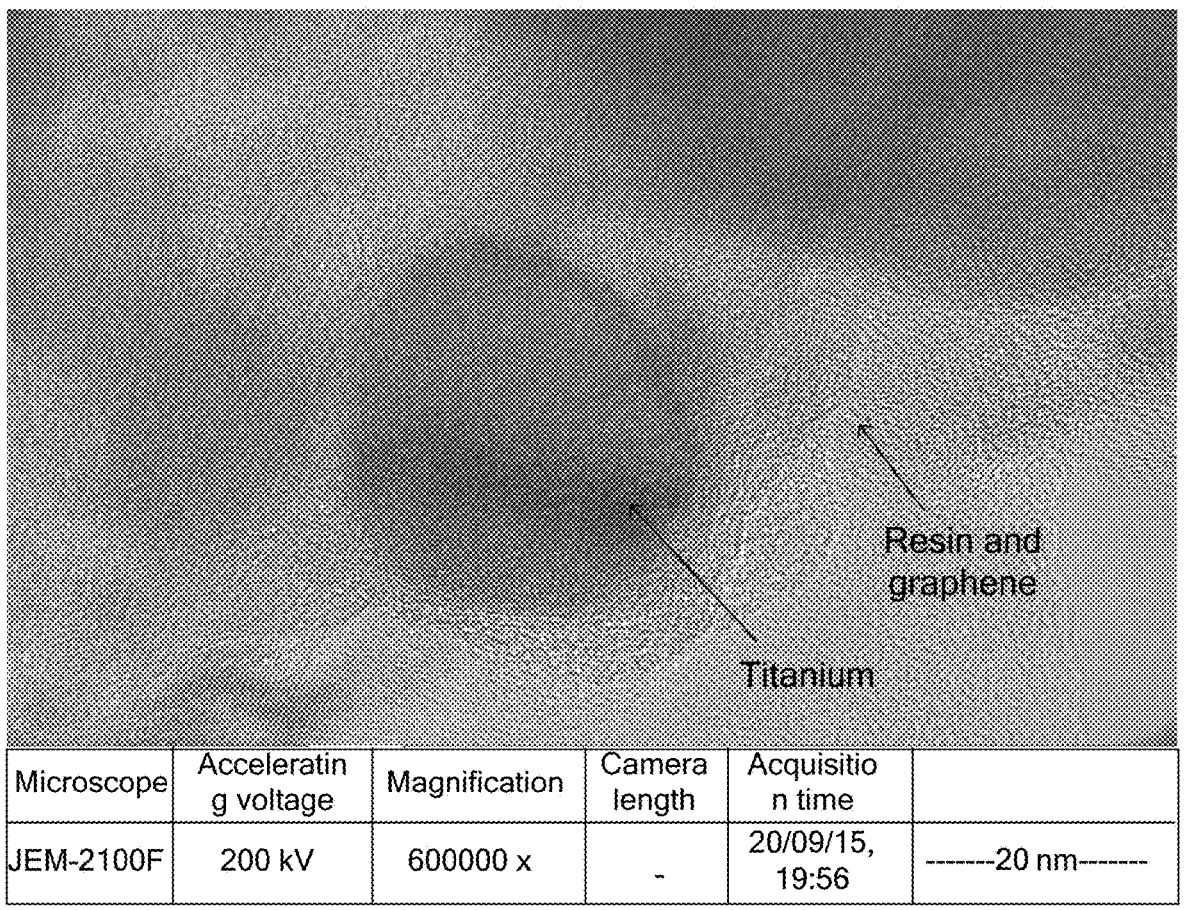
FIG. 12 is an SEM image of the graphene-modified silicon-titanium nano-polymer slurry of Example 1 at a scale of 20 nm.
Figure 13:
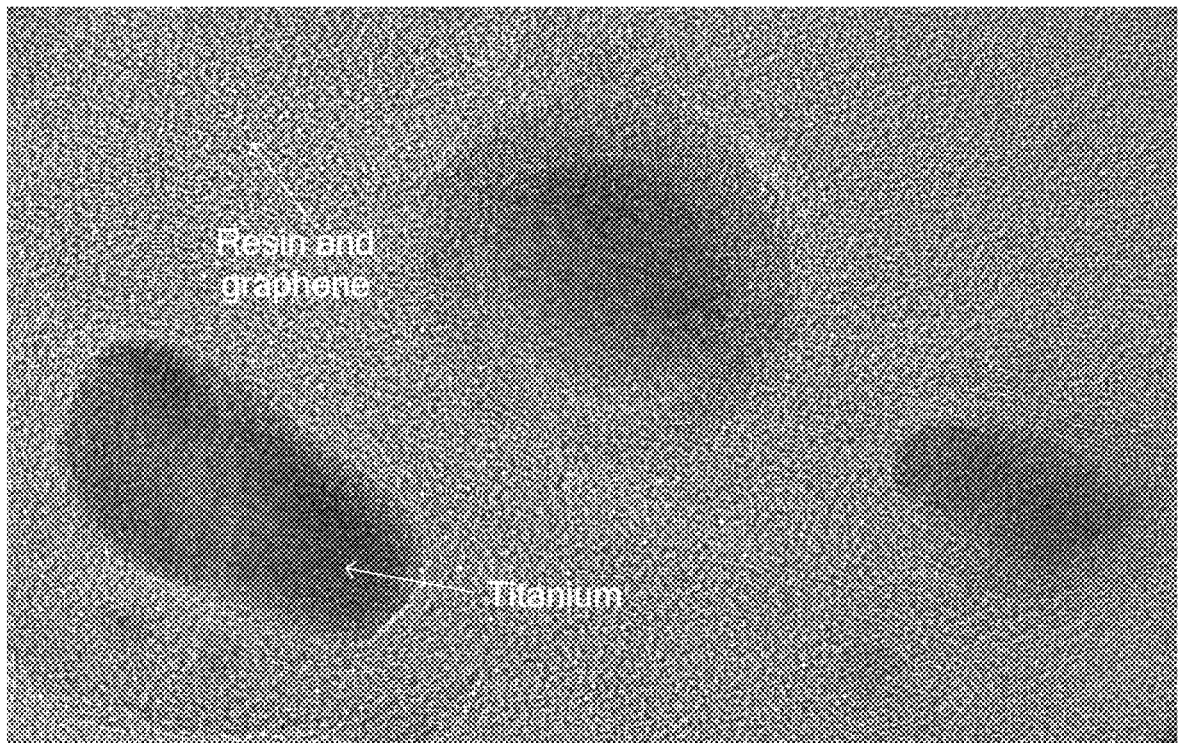
FIG. 13 is an SEM image of the graphene-modified silicon-titanium nano-polymer slurry of Example 1 at a scale of 20 nm.
Figure 14:
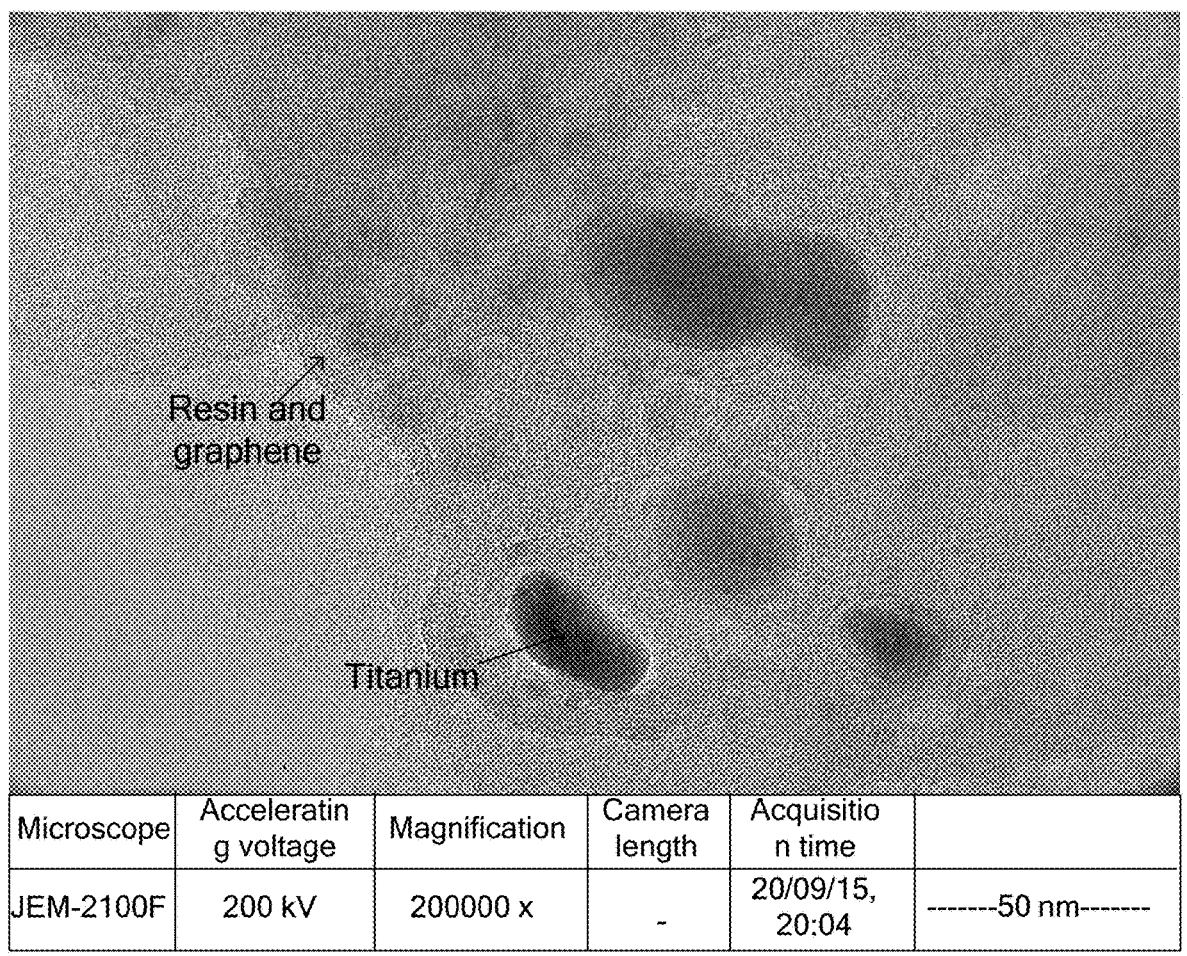
FIG. 14 is an SEM image of the graphene-modified silicon-titanium nano-polymer slurry of Example 1 at a scale of 50 nm.

It can be seen from the HRTEM results in FIG. 4 to FIG. 6 that the graphene-modified silicon-titanium nano-polymer slurry of Example 1 is a dispersion of epoxy resin, graphene, and titanium; titanium is compounded on graphene; and the graphene has a relatively-uniform thickness and has 3 to 5 layers at the thinnest part.

4) The graphene-modified silicon-titanium nano-polymer slurry of Example 1 was subjected to composition analysis, and results were shown in Table 1.

TABLE 1

Composition analysis results of the graphene-modified silicon-titanium nano-polymer slurry of Example 1

| Element | Line type | wt. % | Atom percentage |
|---|---|---|---|
| C | K line system | 9.20 | 27.90 |
| O | K line system | 2.19 | 4.99 |
| Al | K line system | 0.08 | 0.11 |
| Si | K line system | 0.49 | 0.64 |
| Ca | K line system | 0.22 | 0.20 |
| Ti | K line system | 81.57 | 62.02 |
| Cr | K line system | 1.27 | 0.89 |
| Fe | K line system | 4.98 | 3.25 |
| Total | | 100.00 | 100.00 |

It can be seen from Table 1 that, among the components of the graphene-modified silicon-titanium nano-polymer slurry of Example 1, the Ti atom accounts for 62.03%, the C atom accounts for 27.9%, and the O atom accounts for 4.99%.

5) The graphene-modified silicon-titanium nano-polymer slurry of Example 1 and a curing agent (NC2015 of Cardolite) were mixed in a mass ratio of 7:1 and cured to obtain a coating film. The appearance, adhesion, pencil hardness, impact resistance, drying time, and flexibility were tested, and specific steps were as follows: the graphene-modified silicon-titanium nano-polymer slurry was spray-coated once with a dry film thickness of 23 μm+2 μm, a resulting coating layer was air-dried for 2 h and then baked to allow curing at 80° C. for 1 h, and a resulting product was placed at room temperature for 4 h and then tested. The adhesion (pull-off method) was tested, and specific steps were as follows: the graphene-modified silicon-titanium nano-polymer slurry was spray-coated once with a thickness of 100 μm to 150 μm, a resulting coating layer was air-dried for 2 h and then baked to allow curing at 80° C. for 2 h, and a resulting product was placed at room temperature for 4 h and then tested. The chemical resistance, alkali resistance, saturated brine resistance, and acid cooking resistance were tested, and specific steps were as follows: the graphene-modified silicon-titanium nano-polymer slurry was spray-coated 3 times at an interval of 3 h, a resulting coating layer after the 3 times of coating was air-dried for 2 h and then baked to allow curing at 80° C. for 2 h, and a resulting product was placed at room temperature for 4 h and then tested (a thickness of a dry film resulting from each coating was 70 μm to 80 μm, and a total thickness of dry films resulting from the 3 times of coating was 200 μm to 240 μm). The neutral salt spray resistance, heat resistance, and abrasion resistance were tested, and specific steps were as follows: the graphene-modified silicon-titanium nano-polymer slurry was spray-coated 3 times at an interval of 3 h, a resulting coating layer after the 3 times of coating was air-dried for 2 h and then baked to allow curing at 80° C. for 2 h, and a resulting product was placed at room temperature for 4 h and then tested (a thickness of a dry film resulting from each coating was 70 m to 80 m, and a total thickness of dry films resulting from the 3 times of coating was 200 r to 240 m). Test results were shown in Table 2.

TABLE 2

Test results of coating films of the graphene-modified silicon-titanium nano-polymer slurry of Example 1

| No. | Test item | Test basis | Unit | Test results | Determination |
|---|---|---|---|---|---|
| 1 | Coating appearance | GB/T 9761-2008 | — | Smooth | Measured value |
| 2 | Adhesion (specification spacing: 1 mm) | GB/T 9286-1988 | level | 0 | Measured value |
| 3 | Pencil hardness (scratching, Zhonghua 101 drawing pencil) | GB/T 6739-2006 | — | 3H | Measured value |
| 4 | Impact resistance | GB/T 1732-1993 | kg · cm | 50 | Measured value |
| 5 | Drying time Surface zdry | GB/T 1728-1979 | min | 60 (dry) | Measured value |
| | Hard dry | GB/T 1728-1979 | h | 12 (dry) | Measured value |
| 6 | Flexibility | GB/T 1731-1993 | mm | 1 | Measured value |
| 7 | Adhesion (pull-off method) | GB/T 5210-2006 | MPa | 17 | Measured value |
| 8 | Neutral salt spray resistance (1,000 h) | GB/T 1771-2007 GB/T 1766-2008 | — | No blistering, no rusting, no cracking, and no peeling | Measured value |
| 9 | Chemical resistance (10% HCl + 10% H$_2$SO$_4$, 60 d) | GB/T 9274-1988 | — | No blistering, no rusting, no cracking, and slight discoloration | Measured value |
| 10 | Alkali resistance (20% NaOH, 60 d) | GB/T 9274-1988 | — | No blistering, no corrosion, no peeling, and slight discoloration | Measured value |
| 11 | Saturated brine resistance (saturated NaCl solution, 80° C., 240 h) | GB/T 9274-1988 | — | No blistering, no corrosion, no peeling, and no discoloration | Measured value |

TABLE 2-continued

Test results of coating films of the graphene-modified silicon-titanium nano-polymer slurry of Example 1

| No. | Test item | Test basis | Unit | Test results | Determination |
|---|---|---|---|---|---|
| 12 | Heat resistance (250° C., 48 h) | GB/T 1735-2009 | — | No blistering, no peeling, no cracking, and no discoloration | Measured value |
| 13 | Abrasion resistance (1000 g/1000 r, CS-17) | GB/T 1768-2007 | g | 0.028 | Measured value |
| 14 | Acid cooking resistance (10% HCl + 10% $H_2SO_4$, 60° C., 240 h) | GB/T 9274-1988 | — | No blistering, no peeling, no cracking, and slight discoloration | Measured value |

It can be seen from Table 2 that the coating film formed from the graphene-modified silicon-titanium nano-polymer slurry of Example 1 has an adhesion of 17 MPa; after being treated with acid and alkali solutions, the coating film undergoes no blistering, no corrosion, no cracking, and no peeling; after being subjected to a heat treatment, the coating film undergoes no blistering, no peeling, no cracking, and no discoloration, and the wear resistance reaches 0.028 g, indicating that the film formed from the graphene-modified silicon-titanium nano-polymer slurry provided by the present disclosure has high adhesion, high corrosion resistance, and high abrasion resistance.

6) The graphene-modified silicon-titanium nano-polymer slurry of Example 1 was coated on tiles, a corrosive (saturated concentrated brine NaCl) environment was simulated with a high-temperature and high-pressure reactor to accelerate the corrosion to the tiles, and the corrosion resistance and the high-temperature and high-pressure performance of a coating layer in the corrosive environment were tested with a test period of 120 h, a test gas of air, test temperatures of 130° C. and 140° C., and a test pressure of 5 MPa. The test results of the tiles coated with the graphene-modified silicon-titanium nano-polymer slurry of Example 1 before and after corrosion were shown in FIG. 15.

Figure 15:
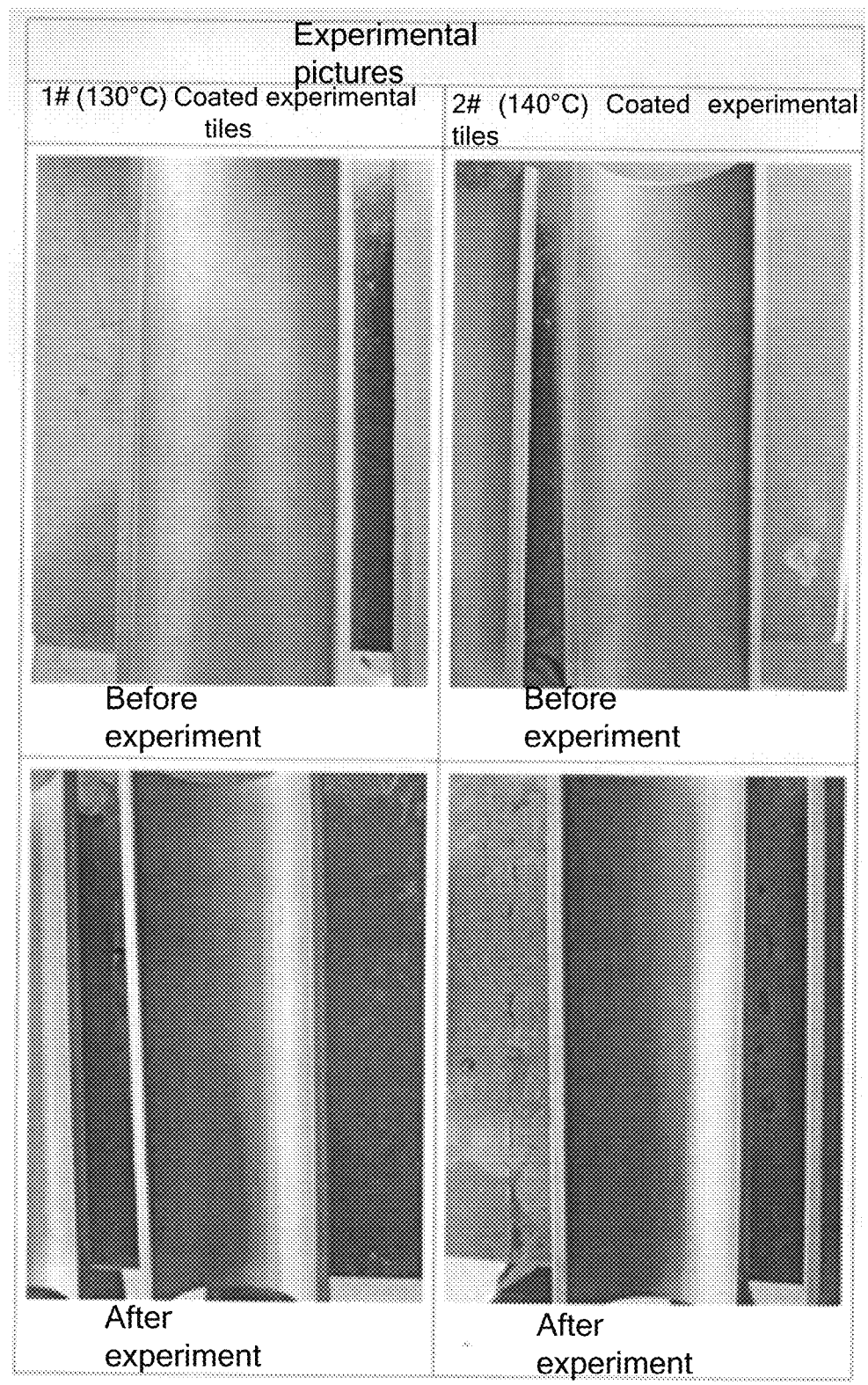
FIG. 15 shows pictures of tiles coated with the graphene-modified silicon-titanium nano-polymer slurry of Example 1 before and after corrosion.

It can be seen from FIG. 15 that, after the tiles coated with the graphene-modified silicon-titanium nano-polymer slurry of Example 1 are treated in the above-mentioned corrosive environment, the tiles undergo no change and still retain the prominent adhesion.

Although the present disclosure has been described in detail through the above examples, the examples are only a part rather than all of the examples of the present disclosure. All other examples obtained by a person based on these examples without creative efforts shall fall within a protection scope of the present disclosure.

What is claimed is:

1. A graphene-modified silicon-titanium nano-polymer slurry, prepared from the following raw materials in parts by mass: 40 to 60 parts of titanium hydride, 2 to 5 parts of activated silica, 1 to 2 parts of silane coupling agent (SCA)-modified graphene, 10 to 30 parts of a silicon-modified epoxy resin, 3 to 6 parts of a reactive diluent, 2 to 10 parts of N-methylpyrrolidone (NMP), 1 to 5 parts of a dispersing agent, 1 to 5 parts of a coupling agent, 0.01 to 0.1 part of a catalyst, 0.1 to 0.2 part of a wetting agent, and 0.1 to 0.2 part of a wetting aid.

2. The graphene-modified silicon-titanium nano-polymer slurry according to claim 1, wherein the titanium hydride has a particle size of greater than or equal to 500 mesh; and the activated silica has a particle size of 2 nm to 15 nm.

3. The graphene-modified silicon-titanium nano-polymer slurry according to claim 1, wherein an SCA in the SCA-modified graphene is γ-aminopropyltriethoxysilane.

4. The graphene-modified silicon-titanium nano-polymer slurry according to claim 1, wherein the SCA-modified graphene has 3 to 7 layers, a thickness of 2 nm to 8 nm, and a sheet diameter of 0.2 m to m.

5. The graphene-modified silicon-titanium nano-polymer slurry according to claim 3, wherein the SCA-modified graphene has 3 to 7 layers, a thickness of 2 nm to 8 nm, and a sheet diameter of 0.2 m to m.

6. The graphene-modified silicon-titanium nano-polymer slurry according to claim 1, wherein a preparation method of the SCA-modified graphene comprises the following steps:
mixing graphene, propylene glycol monomethyl ether acetate (PGMEA), the SCA, and water, and subjecting a resulting mixture to ultraviolet (UV) radiation to obtain the SCA-modified graphene.

7. The graphene-modified silicon-titanium nano-polymer slurry according to claim 3, wherein a preparation method of the SCA-modified graphene comprises the following steps:
mixing graphene, propylene glycol monomethyl ether acetate (PGMEA), the SCA, and water, and subjecting a resulting mixture to ultraviolet (UV) radiation to obtain the SCA-modified graphene.

8. The graphene-modified silicon-titanium nano-polymer slurry according to claim 6, wherein the graphene, the PGMEA, the SCA, and the water are in a mass ratio of (10-300):(5,000-10,000):(1-20):(1-20).

9. The graphene-modified silicon-titanium nano-polymer slurry according to claim 7, wherein the graphene, the PGMEA, the SCA, and the water are in a mass ratio of (10-300):(5,000-10,000):(1-20):(1-20).

10. The graphene-modified silicon-titanium nano-polymer slurry according to claim 6, wherein the UV radiation is conducted at a UV wavelength of 150 nm to 300 nm for 30 min to 90 min.

11. The graphene-modified silicon-titanium nano-polymer slurry according to claim 7, wherein the UV radiation is conducted at a UV wavelength of 150 nm to 300 nm for 30 min to 90 min.

12. The graphene-modified silicon-titanium nano-polymer slurry according to claim 1, wherein the silicon-modified epoxy resin is one or more selected from the group consisting of an active solvent-free silicon-modified epoxy resin, an active silicon-modified epoxy phenolic resin, and an active silazane-modified epoxy resin; and a mass content of silicon in the silicon-modified epoxy resin is higher than 30%.

13. The graphene-modified silicon-titanium nano-polymer slurry according to claim 1, wherein the dispersing agent is a polymer comprising an aromatic ring, a polycyclic compound, an amino group, a carboxyl group, or a sulfonyl group.

14. The graphene-modified silicon-titanium nano-polymer slurry according to claim 1, wherein the reactive diluent is a benzyl glycidyl ether (BGE) reactive diluent or a phenyl glycidyl ether (PGE) reactive diluent.

15. The graphene-modified silicon-titanium nano-polymer slurry according to claim 1, wherein the coupling agent is an epoxy SCA;
the catalyst is nano-cerium oxide and/or silicon-modified nanocrystalline γ-alumina;
the wetting agent is a fluorine-containing acrylate; and the wetting aid is a fluorine-modified acrylate-based siloxane, an alkyl polyoxyethylene ether phosphate, an alkyl phosphate, or a siloxane phosphate.

16. A preparation method of the graphene-modified silicon-titanium nano-polymer slurry according to claim 1, comprising the following steps:
mixing the titanium hydride, the activated silica, the SCA-modified graphene, the silicon-modified epoxy resin, the reactive diluent, the NMP, the dispersing agent, the coupling agent, the catalyst, the wetting agent, and the wetting aid, and subjecting a resulting mixture to low-temperature nano-scale ball-milling to obtain the graphene-modified silicon-titanium nano-polymer slurry,
wherein the low-temperature nano-scale ball-milling is conducted at 50° C. to 70° C.

17. The preparation method according to claim 16, wherein the mixing is achieved by stirring at 800 rpm to 1,000 rpm for 5 min to 30 min.

18. The preparation method according to claim 16, wherein the low-temperature nano-scale ball-milling is conducted at 140 rpm to 160 rpm for 3 h to 10 h.

19. The preparation method according to claim 16, wherein mill balls used for the low-temperature nano-scale ball-milling are made of stainless steel, bearing steel, zirconia ceramic, or agate; the mill balls have a diameter of 5 mm to 15 mm; and a gradation of the mill balls is as follows: 10% of mill balls with a diameter of 5 mm, 20% of mill balls with a diameter of 8 mm, 30% of mill balls with a diameter of 10 mm, 30% of mill balls with a diameter of 12 mm, and 10% of mill balls with a diameter of 15 mm.

20. Method of using the graphene-modified silicon-titanium nano-polymer slurry according to claim 1 in a heavy-duty anti-corrosion coating.

* * * * *